United States Patent [19]

Cunningham

[11] 4,206,336
[45] Jun. 3, 1980

[54] CONTROL APPARATUS PRIMARILY INTENDED FOR USE WITH STOVES EMPLOYING INDUCTION HEATING

[76] Inventor: Ronald J. Cunningham, 320 Patrician Way, Pasadena, Calif. 91105

[21] Appl. No.: 813,799

[22] Filed: Jul. 8, 1977

Related U.S. Application Data

[63] Continuation-in-part of Ser. No. 529,853, Dec. 5, 1974, abandoned.

[51] Int. Cl.² .................... H05B 5/04; H05B 1/02
[52] U.S. Cl. .................... 219/10.49 R; 219/10.77; 219/497; 219/506; 361/358; 340/365 C; 200/DIG. 1
[58] Field of Search .......... 219/10.49, 10.77, 10.55 B, 219/445, 459, 453, 492, 493, 490, 494, 497, 499, 501, 506; 307/116, 238, 239, 252 M, 252 K; 323/101; 235/92 EA, 92 EV, 92 PE, 92 CT; 361/181, 379, 403, 362, 358, 359; 340/337, 365 C, 365 S; 328/5, 48, 71; 363/57, 95, 96, 135; 200/DIG. 1

[56] References Cited

U.S. PATENT DOCUMENTS

| | | | |
|---|---|---|---|
| 3,530,310 | 9/1970 | Adelson et al. | 340/365 C |
| 3,746,923 | 7/1973 | Spira et al. | 338/179 |
| 3,786,219 | 1/1974 | Kornrumpf et al. | 219/10.49 |
| 3,819,906 | 6/1974 | Gould | 219/506 |
| 3,823,297 | 7/1974 | Cunningham | 219/10.77 |
| 4,001,699 | 1/1977 | Denny et al. | 328/71 |
| 4,011,428 | 3/1977 | Fosnough et al. | 219/10.55 B |
| 4,046,991 | 9/1977 | Sefton et al. | 219/501 |

OTHER PUBLICATIONS

Burroughs Application Notes-Bulletin No. B6101.
Reprint from Electronics, 3/7/74, Plasma Displays Put on An Analog Face.
Drawing-Dimensional Research-Touch Control Diag.-Dwng. No. 10100, 12/16/74.

Primary Examiner—B. A. Reynolds
Assistant Examiner—Philip H. Leung
Attorney, Agent, or Firm—Edward D. O'Brian

[57] ABSTRACT

A cooking surface serving as a cook top or stove for use in cooking food can be constructed utilizing a glass support member. In the disclosed structure an induction heating coil is mounted on the undersurface of the support member. An electrically powered graphic display is also mounted on the undersurface of the support member so that this display is visible from above the support member. The support member also carries the parts of two different touch controls which are responsive to the presence of a part of a hand of an individual so as to provide an output signal. What may be referred to as an "electronic package" for controlling the operation of the coil and of the graphic display in synchronism with one another is connected to the parts of the touch controls mounted on the support member and is connected to both the coil and the graphic display. The touch controls can be individually operated so as to either increase or decrease the amount of current supplied to the coil. At all times the graphic display indicates the relative amount of current supplied to the coil and, hence, the heating potential of the coil. Additional touch controls can be provided for preventing accidental and/or unintentional operation of the coil.

4 Claims, 6 Drawing Figures

CONTROL APPARATUS PRIMARILY INTENDED FOR USE WITH STOVES EMPLOYING INDUCTION HEATING

CROSS-REFERENCE TO RELATED APPLICATIONS

This application is a continuation in part of the Ronald J. Cunningham U.S. Patent Application Ser. No. 529,853, filed Dec. 5, 1974, entitled "CONTROL APPARATUS PRIMARILY INTENDED FOR USE WITH STOVES EMPLOYING INDUCTION HEATING", abandoned. The entire disclosure of said application is incorporated herein by reference.

BACKGROUND OF THE INVENTION

The invention set forth in this specification is primarily directed to control apparatus for use with stoves or cook tops employing an electrically powered energy release element or structure for heating purposes. It is considered that the invention is best adapted for use with stoves in which such an energy release structure or element is an induction heating coil, but that the invention is also applicable to other related heating apparatuses such as those employing conventional resistance heating elements.

Since the introduction of the first electrically powered stoves for cooking purposes there have been great improvements in such structures. It is considered that there still remains a distinct need for improvement in the controls or control apparatuses employed in such stoves in order to regulate the amount of heat produced during the operation of such stoves. Probably this can best be illustrated by briefly referring to common known types of controls as have been utilized with electrically powered stoves.

Up to the present virtually all types of stoves manufactured and sold have utilized a knob capable of being physically manipulated in order to rotate a shaft in order to control the operation of a heating unit. While structures of this type are unquestionably utilitarian and satisfactory it is frequently not desirable to use them. Whenever this type of control structure is used it is virtually impossible to mount the control structure on a horizontal surface where it is positioned so that it cannot be actuated by children without creating an area underneath the knob where there is apt to be an accumulation of unsightly materials. Further, whenever a structure of this type is mounted upon a horizontal surface there is danger of cleaning solutions such as soapy water seeping past a shaft used into the interior of the stove.

A recognition of these factors has led to the development of specialized type controls for use with stoves. As an example of this it is now known to magnetically couple a movable actuator for use in controlling the operation of a stove through a nonferromagnetic material with a structure containing a magnet located underneath the stove top. Such a structure is operatively connected to an appropriate mechanism for regulating the operation of the stove.

Controls of this type are considered undesirable for several reasons. The actuators used with them are capable of being removed from the stove. It is considered that there is a distinct possibility that such actuators may become lost and/or be used as playthings and damaged. Further, structures of this type are considered to be undesirable from a mechanical standpoint because of their complexity and the like.

However, it is considered that such structures are in a sense desirable in that they provide a means whereby the operation of a stove can be achieved from above an impervious surface. This has the advantage that the surface can serve to electrically isolate the functioning parts of such a stove from the magnet control utilized above such a surface. This is particularly important in household type applications where there is always significant danger of items being spilled on a stove or cook top as the stove or cook top is operated.

SUMMARY OF THE INVENTION

A broad objective of the present invention is to provide new and improved control apparatus for use with a stove or cook top employing an electrically powered energy release element or structure for heating purposes. Another broad objective of the present invention is to provide control apparatus which forms an integral part of an appropriate impervious support member in such a manner that the support electrically isolates various electrical components from the exposed surface of the support.

Another objective of the present invention is to provide structures as indicated in the preceding which are of such a character that a user may easily and conveniently operate them with a minimal amount of difficulty. A further objective of the present invention is to provide structures as indicated in the preceding which are of such a character as to provide "safety" or child resistant features.

These objectives do not, however, indicate one of the principal aspects of the invention. A very important purpose of the invention is to provide control apparatus for use in combination with an energy release element or structure as indicated in the preceding including means for visually indicating the relative amount of heating capable of being achieved through the use of the element or which is in fact achieved. A further objective of the invention is to provide in the combination indicated a bar graph type display for indicating the heating level of the energy release element or structure which a user will mentally correlate with a common thermometer.

In accordance with this invention these various objectives are achieved by providing an apparatus having an electrically powered energy release means and regulating means for changing the amount of energy released by said release means, said regulating means being connected to said release means in which the improvement comprises: graphic display means for indicating the amount of energy released by said release means, an operation control means for controlling the operation of said regulating means and said display means in synchronism with one another so that the display means at all times indicates the amount of energy released by said release means, said operation control means being connected to said regulating means and said display means, two separate control actuator means for use in setting the amount of energy released by said release means, each of said control actuator means being connected to said operation control means, one of said control actuator means being capable of being actuated so as to cause said operation control means to increase the amount of energy released by said release means, the other of said control actuator means being capable of being actuated so as to cause said operation control means to decrease the amount of energy released by said release means.

BRIEF DESCRIPTION OF THE DRAWINGS

The invention set forth in this specification has many facets and features which are not indicated in the preceding. Because of the nature of the invention it is best more fully described with reference to the accompanying drawings in which.

The invention involves the operative concepts and/or principles set forth and defined in the appended claims forming a part of this disclosure. Because of the rapidly changing character of the field of electronics as well as because of the fact that it is commonplace for various different specific circuits and/or components to be reasonably interchangeable the invention is not to be considered as being limited to the specific circuits illustrated. Those skilled in the art of electronics will realize that the specific circuit shown may be varied to a significant extent without departing from the concepts or principles claimed.

DETAILED DESCRIPTION

Figure 1:
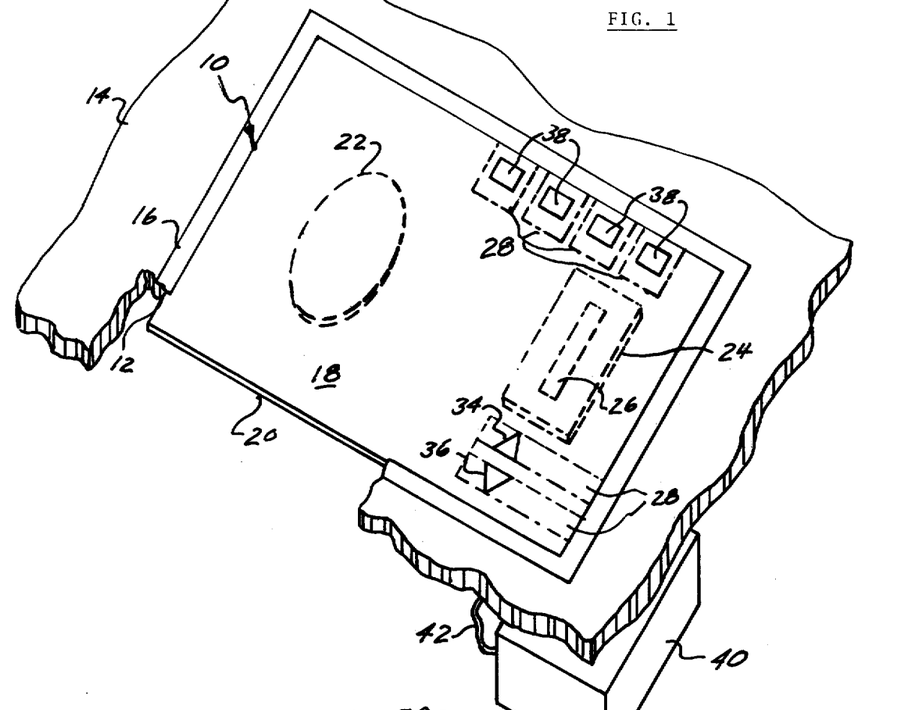
FIG. 1 is an isometric view of a presently preferred cook top or stove in accordance with this invention.

In FIG. 1 of the drawing there is shown a cook top or stove 10 of the present invention which is inset within an opening 12 in a conventional counter 14 in any convenient, conventional manner. Preferably a known, conventional sealing lip 16 is utilized between the cook top 10 and the counter 14 so as to prevent any chance of fluid leakage around the exterior of the cook top 10. In the embodiment of the invention shown this cook top 10 includes an enlarged plate like sheet or support 18 of a known impervious glass having a very low temperature coefficient of expansion. It will be realized that various different types of glass may be utilized in the sheet 18. In many applications it may be desired to substitute for the sheet 18 a roughly equivalent structure (not shown) consisting of one or more ceramic tiles mounted alongside of a glass plate so as to form what in effect constitutes a continuous water impervious surface.

Adhered to the bottom or undersurface 20 of the sheet 18 is a flat induction heating coil 22 serving as an electrically powered energy release means. This coil 22 may be adhered to the sheet 18 in any desired manner or may merely be located adjacent to the sheet on an appropriate conventional mounting (not shown). This coil 22 must be located so that during operation of the cook top 10 it will "couple" with an appropriate metallic utensil (not shown) located on the sheet 18 so that the operation of the coil 22 will release energy causing heating within such a utensil.

The undersurface 20 of the sheet 18 also carries a known electrically powered bar graph display or display panel 24 in such a manner that a line 26 adapted to be illuminated during the use of this display 24 may be visually inspected through the sheet 18 from above the sheet 18. The sheet 18 is provided with six small transparent, coated areas 28 of an electrically conductive material such as stannic oxide which extend from along the bottom 20 around the edge 30 and on the top 32 of the sheet 18. The portion of one of these areas 28 on the top 32 is covered with an electrically non-conductive coating such as a paint or enamel appearing as an upwardly directed arrow 34. A downwardly directed corresponding arrow 36 is provided on other of the areas 28. These arrows 34 and 36 are located adjacent to the display 24 so that the arrows 34 and 36 are directed generally with respect to the line 26 so as to correspond to and/or suggest an increase or decrease in a "level" of illumination extending along this line 26 from one end of this line 26. The other four of the areas 28 are provided with spot-like coated areas 38 roughly corresponding to the arrows 34 and 36.

The cook top 10 is utilized with what may be loosely referred to as an electronic "package" which is indicated in FIG. 1 as consisting of a box 40 electrically connected through the use of appropriate wires 42 to the coil 22, the display 24, and the various coated areas 28 described in the preceding. Although it is possible to mount the box 40 directly on the sheet 18 it is considered preferable to mount the box 40 on any convenient location adjacent to this sheet 18 such as beneath the counter 14. This serves to space the box 40 sufficiently from the coil 22 so that there is no danger of either the box 40 or its contents being heated by the coil 22 as the cook top 10 is used.

Figure 2:
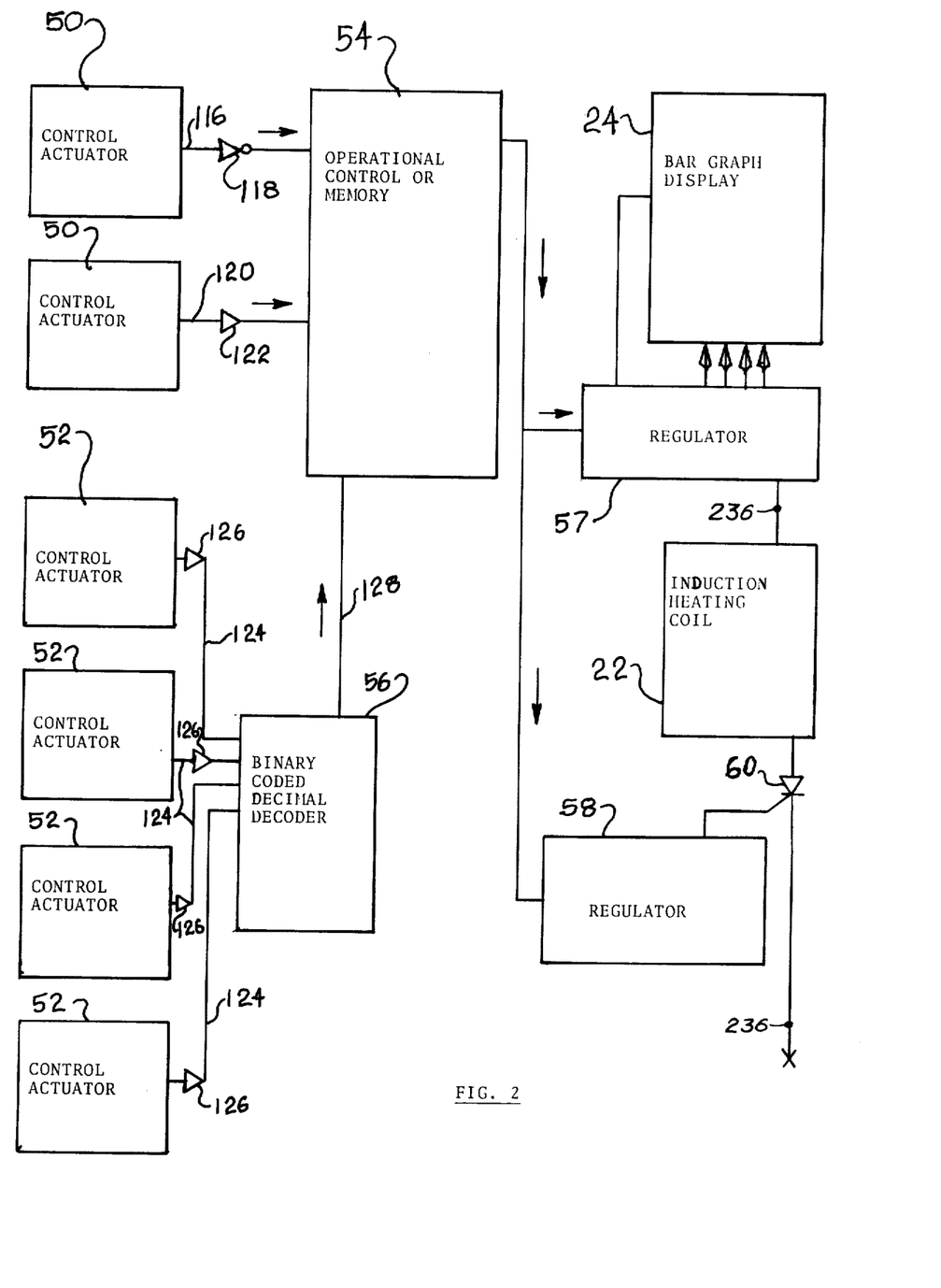
FIG. 2 is a block type diagram indicating the principal circuit components employed in combination in this cook top or stove.

The complete circuit employed with the cook top 10 employs various components as are indicated in FIG. 2 of the drawing which are mounted on the sheet 18 and in the box 40. It is considered that the simplest way to describe this circuit is to refer to FIG. 2 in a generalized manner and then to describe the specific "sub" circuits employed. The circuit used employs two identical control actuators 50 and four identically constructed control actuators 52. These control actuators 50 and 52 preferably are of such a character that they may be referred to as proximity switches.

The control actuators 50 are utilized for the purpose of providing signals to what may be referred to as an operational control or memory 54. The control actuators 52 are utilized to provide signals to a conventional decoder such as a known binary coded decimal decoder 56. This decoder 56 can provide a further signal to the operational control or memory 54.

In accordance with the signals supplied to it, the operational control or memory 54 provides an output signal in the form of a control voltage to a regulator 57 utilized to drive or operate the display 22. The same control voltage is also supplied to what may be referred to as a regulator 58 for the purpose of supplying a signal to the gate of an SCR 60 so as to govern the operation of this SCR 60 in such a manner as to regulate current flow through the SCR 60 to the coil 22 or to a related energy release element.

Figure 3:
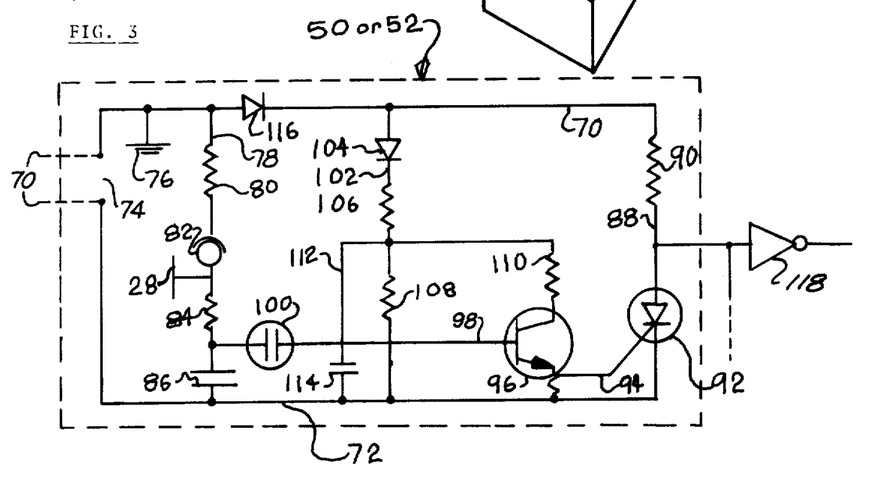
FIG. 3 is a circuit diagram of a control actuator circuit corresponding to certain of the blocks in the block diagram shown in FIG. 2.

The control actuators 50 and 52 utilized are all identically constructed as shown in FIG. 3 of the drawing. Each of these actuators 50 and 52 utilizes supply lines 70 and 72 which are connected to an AC terminal 74. The line 70 is provided with a ground 76 adjacent to the terminal 74. A line 78 extending between these lines 70 and 72 connects in series a current limiting resistor 80, what may be referred to as a "sensor" capacitor 82, another current limiting resistor 84, and a capacitor 86. An area 28 previously described is connected between the capacitor 80 and the resistor 82.

A further line 88 extending between the lines 70 and 72 contains in series a resistor 90 serving as a load and an SCR 92. The gate of the SCR 92 is connected through a line 94 with the emitter of the transistor 96. The base of the transistor 96 is connected by a line 98 to the line 78 at a point between the resistor 86 and the capacitor 84. A neon gas discharge tube 100 is located within the line 98.

Another line 102 extending between the lines 70 and 72 contains in series a rectifying diode 104 and voltage dividing resistors 106 and 108. A regulating resistor 110 is connected to the line 102 between the resistors 106 and 108 and is connected to the collector of the transistor 96. A line 112 extending from the line 102 between the resistors 106 and 108 to the line 72 contains a storage capacitor 114. A rectifying diode 116 is located in the line 70 between the lines 76 and 102.

Since these control actuators 50 and 52 are conventional type proximity switches it is not considered necessary to describe their operation in detail in this specification. When any reasonably conductive and grounded object such as a part of the human body is applied adjacent to an area 28 covered by an arrow 34 or 36 or a coating 38 the capacitance balance in the line 78 will be changed. As soon as the voltage across the capacitor 86 exceeds the breakover voltage of the tube 100 the capacitors 82 and 86 will discharge through the base of the transistor 96. The transistor 96 will amplify this discharge current and will supply the necessary gate drive to turn on the SCR 92. As the SCR 92 becomes conductive an output signal will pass through the line 88.

The output signal from the control actuator 50 associated with the up arrow 34 is conveyed by a line 116 through an inverting amplifier 118 employed for amplification, voltage reduction and impedance matching purposes to the operational control or memory 54. In a similar manner the output signal from the control actuator 50 associated with the down arrow 36 is conveyed by a line 120 through an amplifier 122 employed for amplification and impedance matching purposes to the operational control 54. The output signals from the various control actuators 52 associated with the coated areas 38 are separately passed to the decoder 56 through lines 124 containing amplifiers 126. This decoder 56 supplies a signal to the operational control 54 when appropriate signals are received from the control actuators 52 through a line 128.

The control actuators 52 and the decoder 56 are employed as a part of what may be referred to as a latching or unlatching or as a locking or unlocking "system" (not separately identified). The decoder 56 is a conventional device which in effect serves as a switch when it receives a specific predetermined sequence of output signals from the control actuators 52. Such signals result from the presence of a part of the hand of a user or the like being applied to coated areas 38 in the specific predetermined sequence. The decoder 56 employed is of such a character that such sequence may be set or programmed in advance in any desired manner.

When the cook top 10 is to be turned on so as to be usable for cooking purposes the various control actuators 52 are activated as described in the preceding so as to cause the production of output signals to the decoder 56. If these control actuators 52 are utilized in the sequence programmed into the decoder 56 this decoder provides a signal through the line 128 to the operational control 54; if they are not utilized in the sequence indicated so such signal is provided.

A signal provided from the decoder 56 to the line 128 passes in the operational control 54 to separate AND gates 130, 132 and 134. Such gates are conventional logic elements which will deliver an output only when every input to such an element is simultaneously energized. The gate 130 is connected by the line 116 of the amplifier 118 and is capable of providing an output signal only when an additional signal is provided to it through the line 128. Similarly the gate 132 is connected by the line 120 to the amplifier 122 and is capable of providing an output signal only when it receives an additional signal through the line 128. It is noted that as a matter of routine design choice suitable output signals are produced by the gates 130 and 132 in the particular circuit illustrated in FIG. 4 by the use of a positive power supply to the amplifier 118 and the gate 130 and by the use of a negative power supply to the amplifier 122 and the gate 132. The gate 134 is connected by lines 136 and 138 to the lines 116 and 120, respectively, and is capable of performing an output signal only when it receives signals from all of the lines 128, 136 and 138.

Figure 4:
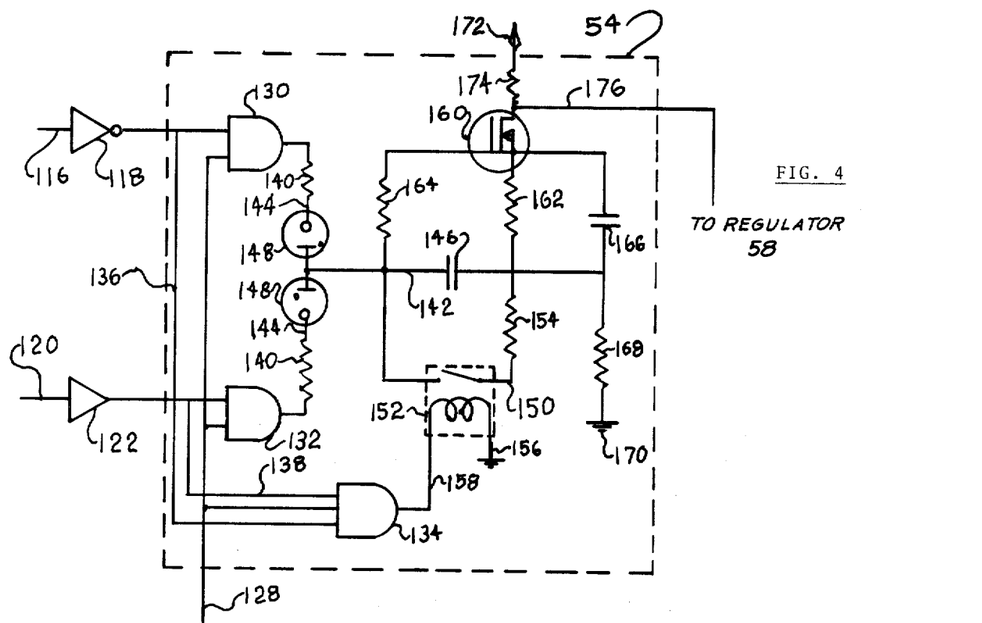
FIG. 4 is a circuit diagram of the operational control or memory corresponding to one of the blocks in the block diagram shown in FIG. 2.

In effect the gates 130, 132 and 134 together with the control actuators 52 and the decoder 56 constitute what was referred to in the preceding as the "system" for locking or unlocking because the operational control 54 is used to provide a control voltage only in accordance with signals as are provided by or through the gates 130, 132 and 134. In the operational control 54 these signals are utilized to determine or set the charge level of a storage capacitor 146 so that the control voltage briefly indicated in the preceding can be regulated in accordance with this charge level.

The capacitor 146 is connected within the operational control 54 in a line 142. One end of this line 142 is connected to two separate lines 144, one of which leads from the output of the gate 130 and the other of which leads from the output of the gate 132. Each of these lines 144 contains in series a current limiting resistor 140 and a neon gas discharge tube 148. These tubes 148 are utilized to pass an appropriate current to the capacitor 146 in accordance with the operation of the control actuators 50 when the gates 130 and 132 are operative so as to pass a signal. These tubes 148 are also utilized in order to electrically isolate the capacitor 146 so as to prevent leakage of the charge on the capacitor 146 back through the gates 130 and 132.

A line 150 is connected to the line 142 around the capacitor 146 for the purpose of connecting the terminals of a relay 152 around the capacitor 146 so that the capacitor 146 may be shorted out by appropriate actuation of the relay 152. This line 150 contains a limiting resistor 154 for the obvious purpose. One end of the coil of the relay 152 is connected to a ground 156 while the other end of this coil is connected by a line 158 to the output of the gate 134. With this type of connection the relay 152 can only be actuated so as to short out the capacitor 146 when signals are concurrently supplied to the gate 134 through the lines 128, 136 and 138.

One end of the capacitor 146 is connected to a field effect transistor 160 through a small biasing resistor 162 while the other terminal of the capacitor 146 is connected to the same transistor 160 through a protective resistor 164. These resistors 162 and 164 are, of course, connected to the line 142. Preferably a bypass capacitor 166 is located in parallel around the resistor 162 in order to improve frequency response characteristics. The end of the line 142 to which the resistor 162 and the capacitor 166 are connected is grounded through a resistor 168 leading to a ground 170. The field effect transistor 160 is connected to an appropriate source (not shown) of a B+ voltage through a line 172 and a load resistor 174. An output line 176 leads from the transistor 160 for the purpose of providing a control voltage output from the operational control or memory 54.

The precise value of this voltage control output is determined by the charge level of the capacitor 146 resulting from the operation of either or both of the control actuators 50. When an appropriate signal is supplied to the gates 130 and 132 through the line 128 the actuation of either of the control actuators 50 will cause a current to pass through the components indicated in the preceding to change the charge on the capacitor 146. Because of the fact that the amplifier 118 is an inverting amplifier, whereas the amplifier 122 is not an inverting amplifier, with the structure described actuation of the control actuator 50 associated with the inverting amplifier 118 will cause a rise in the voltage output in the line 176 whereas actuation of the other control actuator 50 associated with the amplifier 122 will cause a decrease in the control voltage output at the line 176.

When the actuators 50 are actuated concurrently as a control voltage output is being provided at the line 176, the gate 134 will provide an output through the line 158 which will cause the relay 152 to close. This will short out the capacitor 146. This, of course, shuts the operation down so that a control voltage output is no longer provided in the line 176.

Figure 5:
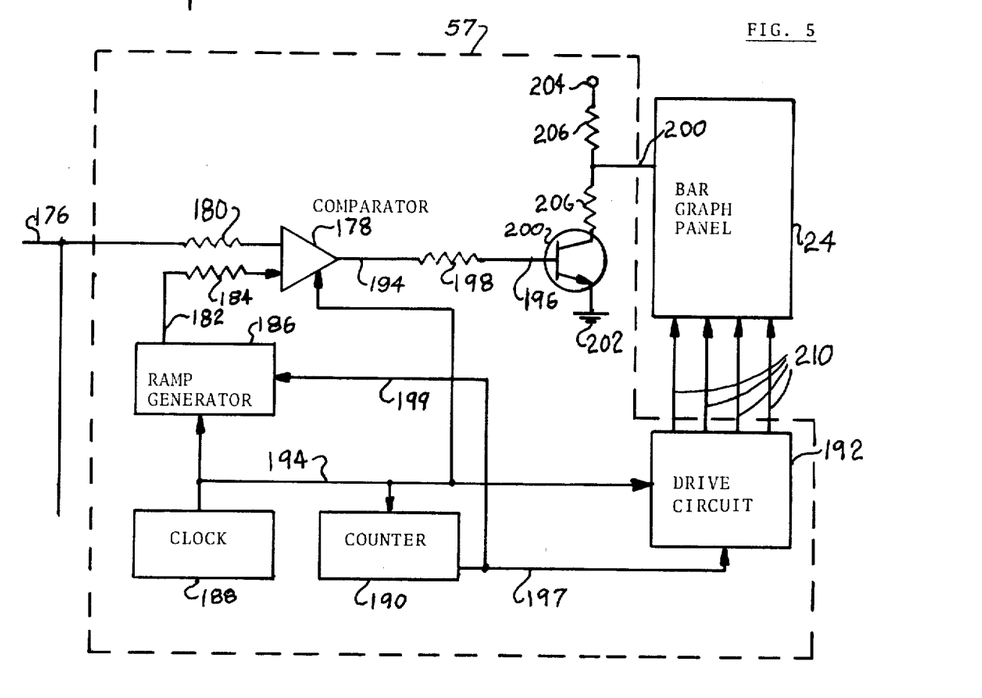
FIG. 5 is a block diagram corresponding to several of the blocks indicated in FIG. 2 indicating the principal circuit components of a regulator circuit utilized to power a bar graph panel in accordance with the invention.

The control voltage output in the line 176 is used to concurrently govern the operation of both the regulator 57 and the regulator 58. The regulator 57 is of a conventional, known design of a type commonly utilized to drive an electronic bar graph display. The display 24 utilized with this invention may be a display such as is known by the trademark "SELF-SCAN" as sold by the Burroughs Corporation. A suitable regulator structure for use with such a display is described in the publication entitled *Burroughs Application Notes Bulletin No. BG*101, dated February 1974. The particular regulator 57 illustrated corresponds to a regulator as shown in this publication. It consists of a voltage comparator 178 having one input connected to the line 176 by a resistor 180 and any other inputs connected by a line 182 containing a resistor 184 to a conventional, known voltage ramp generator 186.

The regulator 57 also includes what is commonly referred to as a clock or timing pulse generator 188 which supplies timing pulses to the ramp generator 186, to the comparator 178, a dividing counter 190, and a drive circuit 192 through appropriate lines 194. The signal supplied by the clock 188 enables the comparator 178 to compare the voltage at the two inputs indicated in the preceding in accordance with a signal from the clock 188 and to provide an output in accordance with such comparison to a line 196 containing a resistor 198 to the base of a transistor 200. The emitter of this transistor 200 is grounded at a ground 202 while the collector of this transistor 200 is connected to a terminal 204 serving as a source of B+ voltage through two different resistors 206 to the bar graph display 24.

The counter 190 serves to divide the number of output pulses from the clock 188 in accordance with the construction of the display 24 so as to provide a fraction of such pulses through a line 197 to the drive circuit 192. A branch 199 of this line 196 is connected to the ramp generator 186 so as to govern the ramp generator. The output supplied from the counter 190 to the drive circuit 192 and the ramp generator 186 are used to govern the operation of this drive circuit 192 and ramp generator 186 in such a manner as to periodically serve to "reset" the display 24.

The actual operation of the display 24 is a result of a known interaction of the signals supplied through the line 200 and through appropriate drive lines 210 connecting the drive circuit 192 with the panel 24. The particular display 24 identified in the preceding is of such a character that the signals supplied to it maintain the line 26 previously described so that it appears to the eye as being continuously illuminated along a length which varies in accordance with the voltage level of the control voltage at the line 176. In fact, however, this line 26 consists of discreet sources of illumination which are constantly being switched on and off at a frequency so rapid that the changes in illumination are not apparent to the normal human eye. The number of such segments illuminated depends upon the level of the control voltage at the line 176 and is determined by a comparison at periodic intervals of this control voltage with the voltage ramps produced by the ramp generator 186 in accordance with the timing signal from the clock 188.

Figure 6:
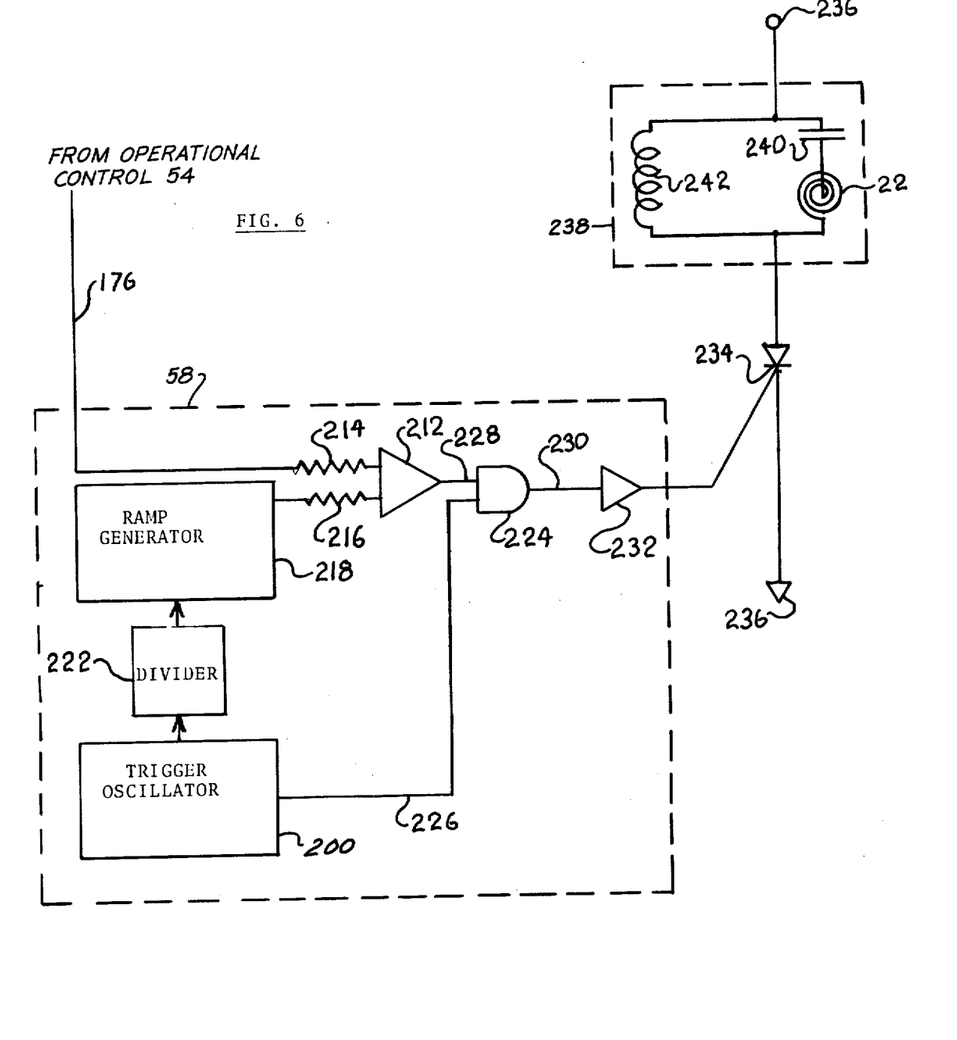
FIG. 6 is a block diagram corresponding to several of the blocks indicated in FIG. 2 indicating the principal components of a regulator circuit utilized to power an energy release means such as an induction heating coil or a resistance heating element in accordance with the invention.

The regulator 58 also utilizes a comparator 212 which corresponds to the comparator 178 indicated in the preceding. This comparator 212 receives an input signal from the line 176 through a resistor 214. It also receives another input signal through a resistor 216 from a ramp generator 218 corresponding to the ramp generator 186 described in the preceding. The timing of the ramp generator 218 is governed by a triggering oscillator 200 which provides an output signal to the ramp generator 218 through a dividing counter 222 corresponding to the counter 190 previously described.

This triggering oscillator 200 is connected to another AND gate 224 through a line 226. The comparator 212 also provides an output through a line 228 to this same gate 224. With this structure when the comparator at any particular instant in comparing the voltage levels of a ramp created by the ramp generator 218 and the voltage level of the control voltage in the line 176 provides an output at the same time a pulse is supplied by the oscillator 220 to the gate 224, the gate 224 will pass a signal to a line 230 containing a conventional amplifier 232. This line 230 is connected to the gate of an SCR 234 and is utilized to render the SCR 234 conductive so that current can flow between terminals 236 through an induction heating coil 22. Preferably this coil 22 is located within one leg of a resonant tank circuit 238 including a capacitor 240 and an inductor 242 as shown. It is to be understood, however, that the tank circuit 238 may be replaced with any desired electrically powered energy release means such as a conventional resistance heating element (not shown).

It is believed that it will be apparent from the preceding that the particular structure and/or circuit indicated achieves the various objectives of the invention indicated in the section of this specification entitled "SUMMARY OF THE INVENTION". In utilizing the broad concepts of the invention it is possible to omit the control actuators 52, the decoder 56 and the various gates 130, 132 and 134. Such an omission would allow operation merely through the actuation of the two control actuators 50. It is possible to omit the gates 130 and 132 and to modify the gate 134 so that it will pass a signal when only inputs from the control actuators 50 are supplied to it. Such a structure can be turned off by mere simultaneous operation of the actuators 50.

It is preferred to utilize the entire structure described because the entire structure indicated is of an effective, child resistant character in that a child cannot turn the circuit described on so as to cause heating without knowing what in effect is the "combination" consisting of the sequence in which the actuators 52 must be actuated to enable the other actuators 50 to be actuated so as to set a heating level. In accordance with this invention this level may be increased by actuating the actuator 50 associated with the up arrow 34 or by actuation of the actuator 50 associated with the down arrow 36. The level at which heating may be accomplished is changed as long as either of these two actuators is being operated and remains at a constant value when these actuators are not being utilized. An important facet of the invention lies in the fact that the bar graph display 24 at all times is operated in synchronism with the coil 22 serving as a heating element so that visually the level of operation of the heating element can be determined.

The decoder 56 can be utilized in order to "set" or fix any level of heating indicated by the bar graph display 24 at any particular time by being programmed so as not to supply a signal through the line 128 to the gates 130, 132 and 134 when the control actuators 52 are utilized in a particular sequence. This same programming can be utilized to effectively turn off the cook top 10 so that it can no longer be used for cooking purposes after the control actuators 50 have been operated so as to short out the capacitor 146. If desired conventional reset circuitry can be employed so as to connect the line 158 with the decoder 56 in order to operate the decoder so that it no longer supplies a signal through the line 128 each time the relay 152 is operated so as to short out the capacitor 146.

I claim:

1. An apparatus having an induction heating coil means and a circuit means including energy release means for supplying variable amounts of electric power to said induction heating coil, said circuit means being connected to said heating coil in which the improvement comprises:
   an electrically powered bar graph display means for indicating the amount of electric power supplied to said heating coil by the length of a visible line,
   an operation control means for controlling the operation of said circuit means and said bar graph display means in synchronism with one another so that said display means at all times indicates the amount of electric power supplied to said heating coil, said operation control means being connected to said circuit means and said bar graph display means,
   two separate control actuator switch means for use in setting the amount of energy released by said release means, each of said actuator switch means being connected to said operation control means,
   one of said control actuator switch means for causing, upon actuation, said operation control means to increase the amount of electric power supplied to said heating coil, the other of said control actuator switch means being capable of being actuated so as to cause said operation control means to decrease the amount of electric power supplied to said heating coil,
   separate latch means for rendering said control actuator switch means operative connected to said operation control means, said latch means providing, upon actuation, a predetermined signal to said operation control means.

2. An apparatus as claimed in claim 1 wherein:
   said separate latch means comprises a series of other, separate latch switch means for providing signals to a decoder means and decoder means for providing a signal in response to a predetermined signal from said other, separate latch switch means, said operation control means being responsive to said signal from said decoder means so as to render said control actuator switch means operative.

3. An apparatus as claimed in claim 2 wherein:
   each of said other separate latch switch means of said other, separate latch switch means comprises proximity switch means capable of providing an output to said decoder means.

4. An apparatus having an induction heating coil means and a circuit means including energy release means for supplying variable amounts of electric power to said induction heating coil, said circuit means being connected to said heating coil in which the improvement comprises:
   a water impervious, glass plate serving as a cook top,
   an electrically powered bar graph display means for indicating the amount of electric power supplied to said heating coil by the length of a visible line,
   said bar graph display means being located on the undersurface of said cook top and being visible through said cook top,
   an operation control means for controlling the operation of said circuit means and said bar graph display means in synchronism with one another so that said display means at all times indicates the amount of electric power supplied to said heating coil, said operation control means being connected to said circuit means and said bar graph display means,
   two separate control actuator switch means for use in setting the amount of energy released by said release means, each of said actuator switch means being connected to said operation control means,
   one of said control actuator switch means for causing, upon actuation, said operation control means to increase the amount of electric power supplied to said heating coil, the other of said control actuator switch means being capable of being actuated so as to cause said operation control means to decrease the amount of electric power supplied to said heating coil,
   each of said control actuator switch means comprising a proximity switch means capable of providing an output to said operation control means,
   each of said control actuator switch means being mounted on said cook top and being capable of being actuated from above said cook top, separate latch means for rendering said control actuator switch means operative connected to said operation control means, said separate latch means comprising a series of other, separate latch switch means for providing signals to a decoder means and a decoder means for providing a signal in response to a predetermined signal from said other, separate latch switch means, said operation control means being responsive to said signal from said decoder means so as to render said control actuator switch means operative, each of said other separate latch switch means of said latch means comprises proximity switch means capable of providing an output to said decoder means.

* * * * *